US012781679B2

(12) United States Patent
Lucido et al.

(10) Patent No.: US 12,781,679 B2

(45) Date of Patent: Nov. 3, 2026

(54) STARTER AND BELT ALTERNATOR STARTER CONTROL SYSTEMS AND METHODS

(71) Applicant: GM GLOBAL TECHNOLOGY OPERATIONS LLC, Detroit, MI (US)

(72) Inventors: Michael J. Lucido, Milford, MI (US); Rafat F. Hattar, Royal Oak, MI (US); Vijay A. Ramappan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 18/965,232

(22) Filed: Dec. 2, 2024

(65) Prior Publication Data

US 2026/0153060 A1 Jun. 4, 2026

(51) Int. Cl.

*F02D 41/06* (2006.01)
*F02N 11/08* (2006.01)

(52) U.S. Cl.

CPC ........ *F02D 41/064* (2013.01); *F02N 11/0859* (2013.01); *F02N 11/0866* (2013.01); *F02D 2200/101* (2013.01); *F02D 2200/50* (2013.01); *F02D 2200/70* (2013.01); *F02N 2200/022* (2013.01); *F02N 2200/061* (2013.01); *F02N 2200/122* (2013.01)

(58) Field of Classification Search

CPC . F02N 11/0866; F02N 11/0859; F02D 41/064
See application file for complete search history.

(56) References Cited

U.S. PATENT DOCUMENTS

| | | | | |
|---|---|---|---|---|
| 6,555,927 | B1 | 4/2003 | Suzuki et al. | |
| 9,828,924 | B1 * | 11/2017 | Connolly .............. | B60W 10/08 |
| 11,661,914 | B2 * | 5/2023 | Banker ................. | B60W 10/02 123/179.3 |
| 2021/0394741 | A1 | 12/2021 | Saito et al. | |

FOREIGN PATENT DOCUMENTS

| | | | |
|---|---|---|---|
| DE | 19705610 | A1 | 12/1997 |
| DE | 102022110600 | A1 | 2/2023 |
| EP | 1355062 | A2 | 10/2003 |

OTHER PUBLICATIONS

German Office Action from counterpart DE1020251015783, dated Sep. 30, 2025.

* cited by examiner

*Primary Examiner* — Kevin A Lathers

(57) ABSTRACT

An engine startup system for a vehicle includes: a cold start module configured to selectively generate a cold start command when an ambient air temperature is less than a predetermined temperature; a starter control module configured to, in response to the generation of the cold start command, engage a starter motor with a crankshaft of an engine and apply power from a first battery to the starter motor; and a belt alternator starter (BAS) control module configured to: not apply power from a second battery to a BAS after the generation of the cold start command until an engine speed of the engine is greater than a first predetermined speed; and in response to a determination that the engine speed of the engine is greater than the first predetermined speed, apply power from the second battery to the BAS and further increase the engine speed of the engine.

20 Claims, 4 Drawing Sheets

STARTER AND BELT ALTERNATOR STARTER CONTROL SYSTEMS AND METHODS

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to engines and more particularly to systems and methods for starting engines.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. The present application is applicable to electric vehicles, hybrid vehicles, and other types of vehicles.

SUMMARY

In a feature, an engine startup system for a vehicle includes: a cold start module configured to selectively generate a cold start command when an ambient air temperature is less than a predetermined temperature; a starter control module configured to, in response to the generation of the cold start command, engage a starter motor with a crankshaft of an engine and apply power from a first battery to the starter motor; and a belt alternator starter (BAS) control module configured to: not apply power from a second battery to a BAS after the generation of the cold start command until an engine speed of the engine is greater than a first predetermined speed; and in response to a determination that the engine speed of the engine is greater than the first predetermined speed, apply power from the second battery to the BAS and further increase the engine speed of the engine.

In further features, an engine control module is configured to begin fueling the engine and providing spark to the engine only once the engine speed is greater than a second predetermined speed.

In further features, the second predetermined speed is greater than the first predetermined speed.

In further features, the second predetermined speed is at least 400 revolutions per minute.

In further features, the second battery is a different battery than the first battery.

In further features, a first voltage rating of the second battery is greater than a second voltage rating of the first battery.

In further features, the second voltage rating is approximately 12 volts direct current (DC).

In further features, the BAS is configured to convert mechanical energy from the engine into electrical energy and charge the second battery with the electrical energy.

In further features, an electric propulsion motor is configured to generate propulsion torque using power from the second battery.

In further features, the ambient air temperature is less than 0 degrees Celsius.

In further features, the BAS is coupled to a pulley of the engine via a belt.

In further features, the BAS control module is configured to, before applying power from the second battery to the BAS and further increase the speed of the engine, match a rotational speed of the BAS to the engine speed.

In further features, the BAS control module is configured to match the rotational speed of the BAS to the engine speed using closed loop control.

In further features, the cold start module is configured to generate the cold start command when both (a) the ambient air temperature is less than the predetermined temperature and (b) a state of charge of the second battery is less than a predetermined state of charge.

In further features, the predetermined temperature is set based on a torque to begin turning a crankshaft of the engine at the predetermined temperature.

In a feature, an engine startup system for a vehicle includes: a starter control module configured to, in response to generation of a cold start command, engage a starter motor with a crankshaft of an engine and apply power from a first battery to the starter motor; a cold start module configured to generate the cold start command when both (a) an ambient air temperature is less than a predetermined temperature and (b) a state of charge of a second battery is less than a predetermined state of charge; a belt alternator starter (BAS) control module configured to: not apply power from the second battery to a BAS after the generation of the cold start command until an engine speed of the engine is greater than a first predetermined speed; and in response to a determination that the engine speed of the engine is greater than the first predetermined speed, apply power from the second battery to the BAS and further increase the engine speed of the engine; an engine control module configured to begin fueling the engine and providing spark to the engine only once the engine speed is greater than a second predetermined speed, where the second predetermined speed is greater than the first predetermined speed, where the second battery is a different battery than the first battery, and where a first voltage rating of the second battery is greater than a second voltage rating of the first battery; and an electric propulsion motor configured to generate propulsion torque using power from the second battery.

In a feature, an engine startup method for a vehicle includes: selectively generating a cold start command when an ambient air temperature is less than a predetermined temperature; in response to the generation of the cold start command, engaging a starter motor with a crankshaft of an engine and applying power from a first battery to the starter motor; not applying power from a second battery to a belt alternator starter (BAS) after the generation of the cold start command until an engine speed of the engine is greater than a first predetermined speed; and in response to a determination that the engine speed of the engine is greater than the first predetermined speed, applying power from the second battery to the BAS and further increase the engine speed of the engine.

In further features, the method further includes beginning fueling the engine and providing spark to the engine only once the engine speed is greater than a second predetermined speed.

In further features, the second predetermined speed is greater than the first predetermined speed.

In further features, the second battery is a different battery than the first battery.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes one or more electric propulsion motors. The vehicle also includes an internal combustion engine. The engine may be started and run to generate power to recharge a battery from which the electric propulsion motor(s) propel the vehicle.

A belt alternator starter is coupled to a pulley of the engine via a belt that encircles the pulley of the engine and a pulley of the belt alternator starter. The belt alternator starter can output a positive torque to start the engine when the engine is off and not running. While the engine is running, the belt alternator starter can output a negative torque to generate electrical power to charge the battery.

At low ambient air temperatures, however, the belt may slip, make noise, and/or be damaged if the belt alternator starter is used to start the engine.

The present application involves using a starter to begin starting the engine when the ambient air temperature is less than a predetermined temperature. Once the engine reaches a predetermined engine speed, the belt alternator starter is controlled to match the speed of the engine and then used to complete the start of the engine. This prevents potential belt slippage, noise, and damage, allows for the use of a less costly belt alternator starter, ensures consistent times to complete starting of the engine.

Figure 1:
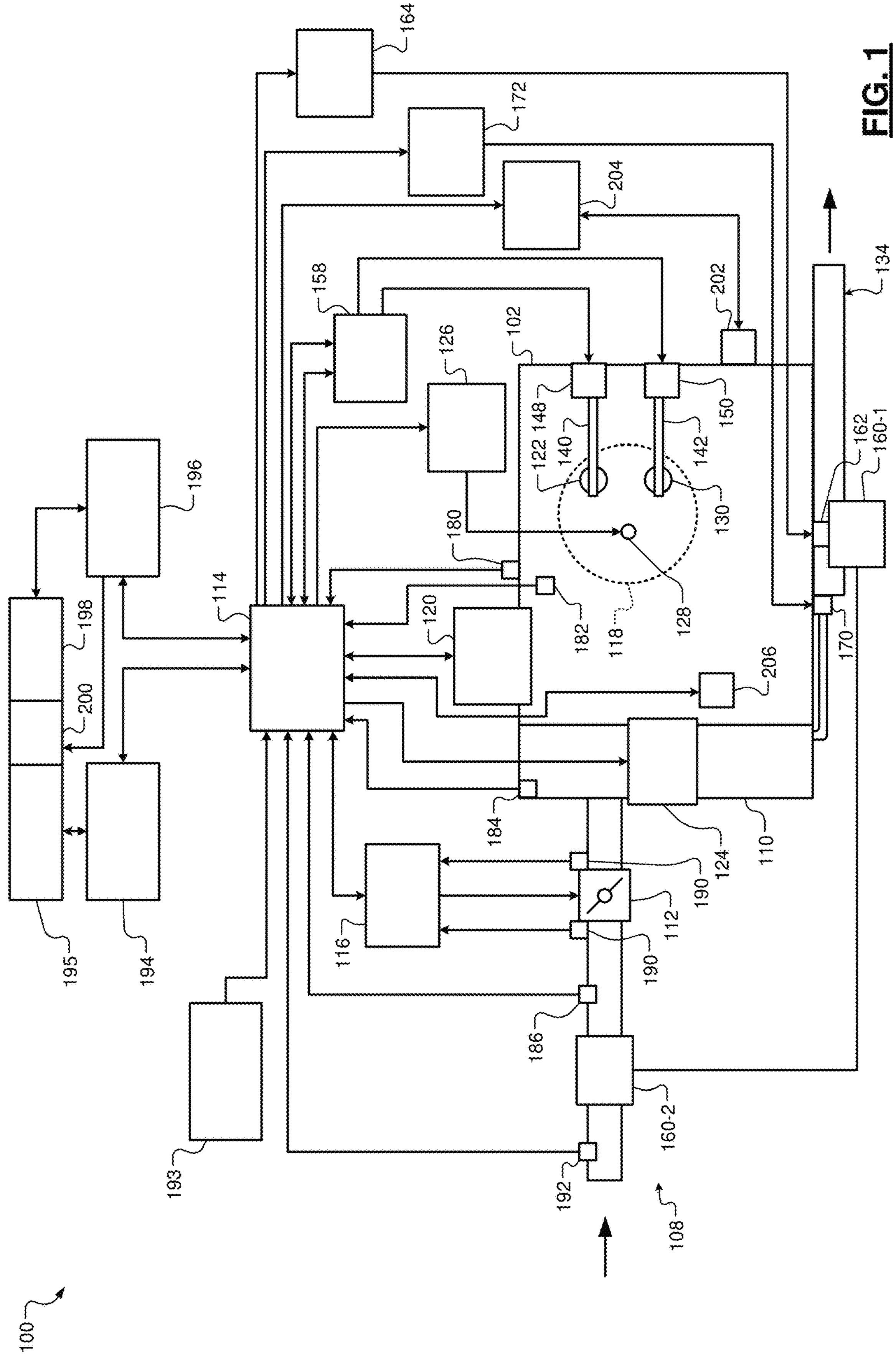
FIG. 1 is a functional block diagram of an example engine control system.

Referring now to FIG. 1, a functional block diagram of an example powertrain system 100 is presented for a hybrid vehicle. While the example of a hybrid vehicle is provided, the present application is applicable to non-vehicle applications that include a battery and other types of vehicles (e.g., electric, internal combustion engine, etc.).

The powertrain system 100 of a vehicle includes an engine 102 that combusts an air/fuel mixture to produce torque. The vehicle may be non-autonomous or autonomous. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180, such as based on a change in the crankshaft period over time. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, which controls operation of a transmission 195. The ECM 114 may communicate with a hybrid control module 196, for example, to coordinate operation of the engine 102 and an electric motor 198. While the example of one electric motor is provided, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 (FIG. 2) to the electric motor 198 to cause the electric motor 198 to output positive torque. The battery is discussed further below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

Figure 2:
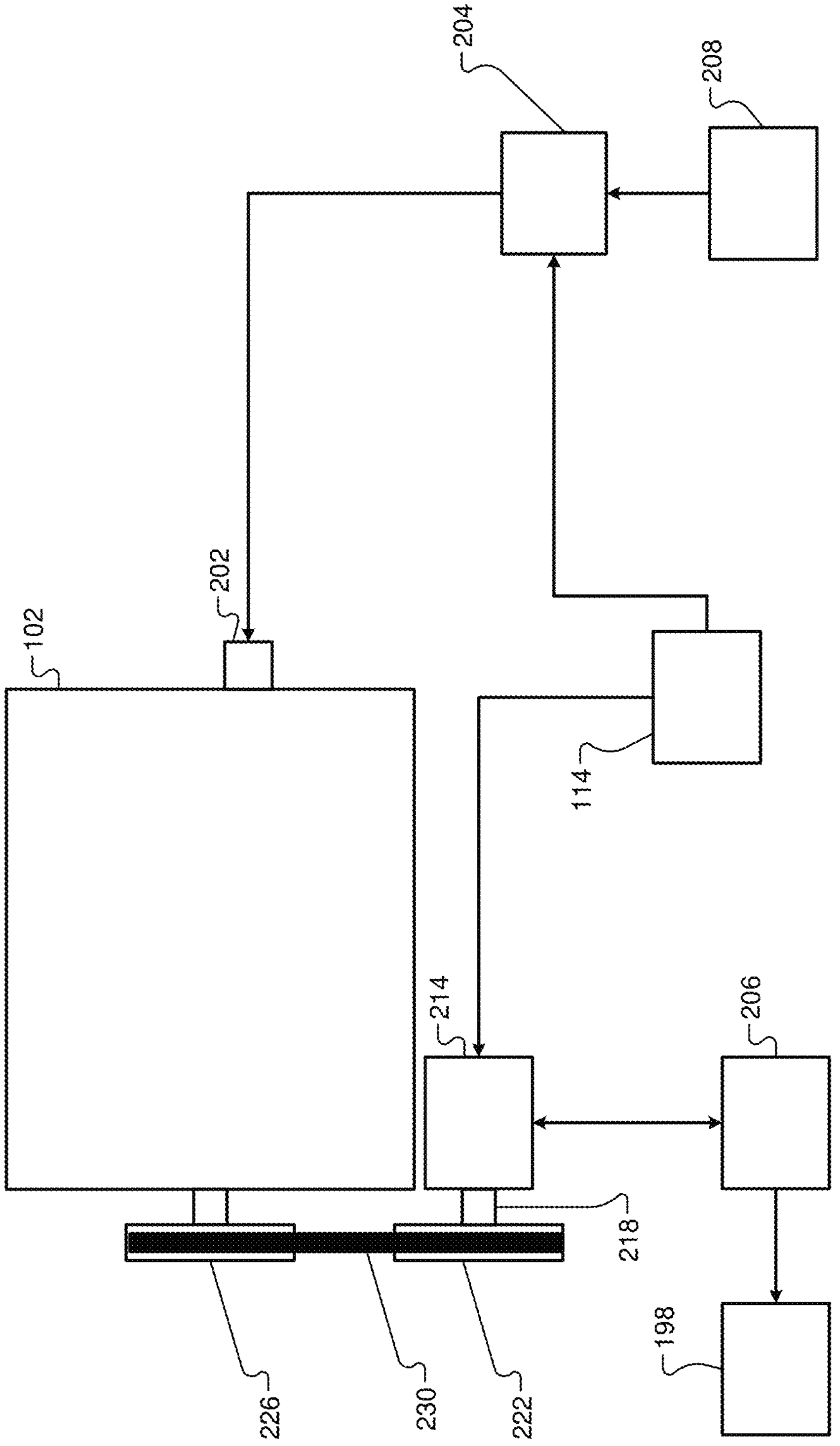
FIG. 2 is a functional block diagram an example engine start system.

Referring now to FIGS. 1 and 2, the ECM 114 begins some startups of the engine 102 via a starter motor 202 as discussed further below. FIG. 2 is a block diagram of an example engine startup system. The ECM 114 also starts the engine 102 via a belt alternator starter (BAS) as discussed further below. The ECM 114 or another suitable module of the vehicle engages the starter motor 202 with the engine 102 to start the engine. For example only, the ECM 114 may start the engine 102 when a key ON command is received. A driver may input a key ON command, for example, via actuating one or more ignition keys, buttons, and/or switches of the vehicle or of a key fob of the vehicle. The starter motor 202 may engage and drive rotation of a flywheel coupled to the crankshaft or one or more other suitable components that drive rotation of the crankshaft.

The ECM 114 may also start the engine 102 when a SOC of a battery 206 is less than a predetermined value, as discussed further below The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from the ECM 114.

In response to a command to start the engine 102, in some situations, the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). Application of current to the belt alternator starter 214 also drives rotation of the crankshaft. The period of the starter motor 202 and/or the belt alternator starter 214 driving the crankshaft to start the engine 102 may be referred to as engine cranking.

The starter motor 202 draws power from the battery 208 (e.g., a 12 Volt battery) to start the engine 102. The belt alternator starter 214 draws power from the battery 206 to start the engine 102.

Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined idle speed. Engine cranking may be said to be completed when the engine 102 is running.

The belt alternator starter 214 includes an output shaft 218 and a pulley 222. The output shaft 218 is coupled to and rotates with the pulley 222. The engine 102 also includes a pulley 226. Rotation of the pulley 226 drives rotation of the crankshaft of the engine 102. A belt 230 encircles the pulleys 222 and pulley 226 such that the pulleys 222 and 226 rotate together.

The belt alternator starter 214 outputs positive torque to the engine 102 via the belt 230 to start the engine 102. When the engine 102 is running, the belt alternator starter 214 may apply a negative torque on the engine 102 via the belt 230 to convert mechanical energy of the engine 102 into electrical energy to charge the battery 206. The electric motor(s) 198 generate propulsion torque to propel the vehicle using power from the battery 206.

The belt alternator starter 214 may start the engine 102 using power from the battery 206. The starter motor 202 may start the engine 102 using power from the battery 208. The battery 206 may have a different (e.g., higher) voltage than the battery 208 (e.g., nominal 12 V DC).

Figure 3:
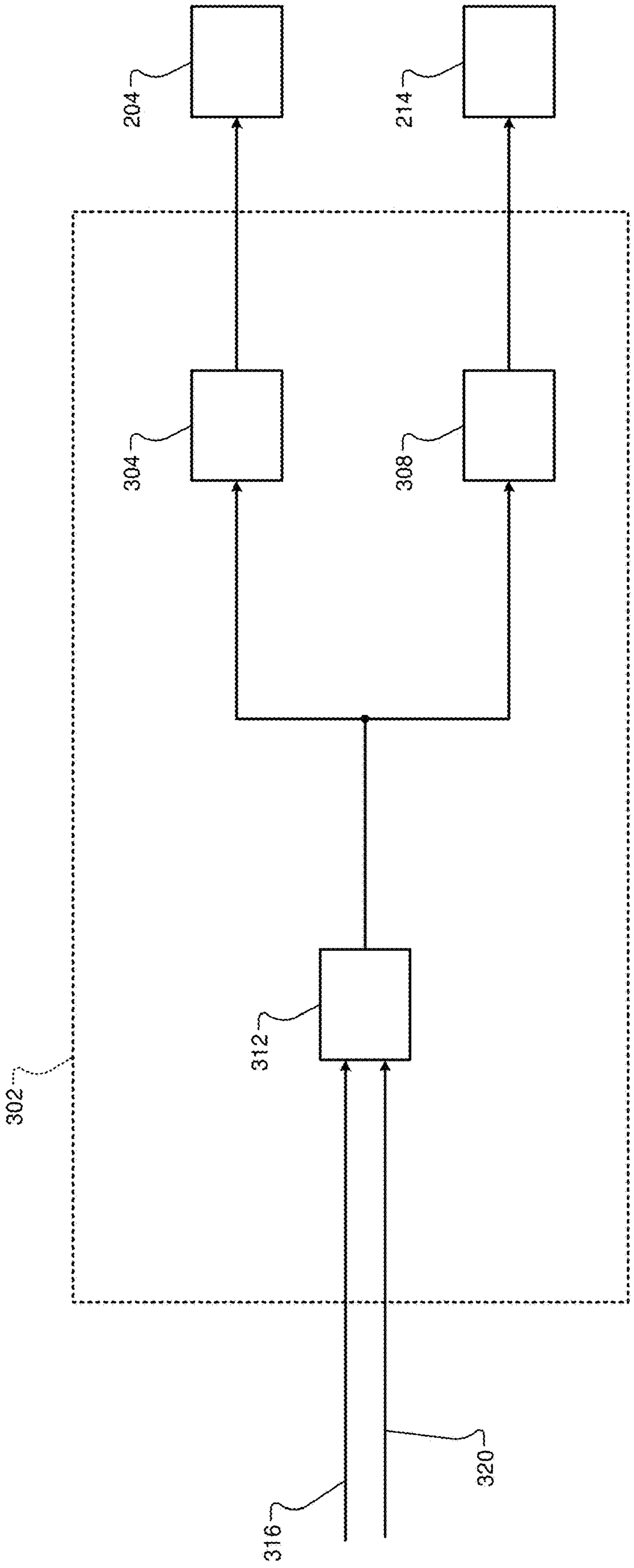
FIG. 3 is a functional block diagram of an example start control module.

FIG. 3 is a functional block diagram of an example implementation of a start control module 302. The start control module 302 may be implemented, for example, in the ECM 114, independently, or in another module of the vehicle.

A starter control module 304 controls application of power to the starter motor 202, such as for startups of the engine 102. A BAS control module 308 operation of the BAS 214. For example, the BAS control module 308 controls positive torque output of the BAS 214 for startups of the engine 102. While the engine 102 is running, the BAS control module 308 controls negative torque applied by the BAS 214 for electric power generation, for example, to charge the battery 206.

A cold start module 312 selectively initiates cold startups of the engine 102 using starter motor 202 and later the BAS 214 as discussed further below. The cold start module 312 may initiate a cold startup of the engine 102 for example, when a present state of charge (SOC) 316 of the battery 206 is less than a predetermined SOC and an ambient air temperature 320 is less than a predetermined cold start temperature. Non-cold startups of the engine 102 may be performed using the BAS 214 and without the starter motor 202. The ambient temperature 320 may be measured using a temperature sensor or obtained in another suitable manner. The present SOC 316 may be determined (e.g., by a state of charge module), for example, by Coulomb counting, based on current flow to and from the battery 206.

Figure 4:
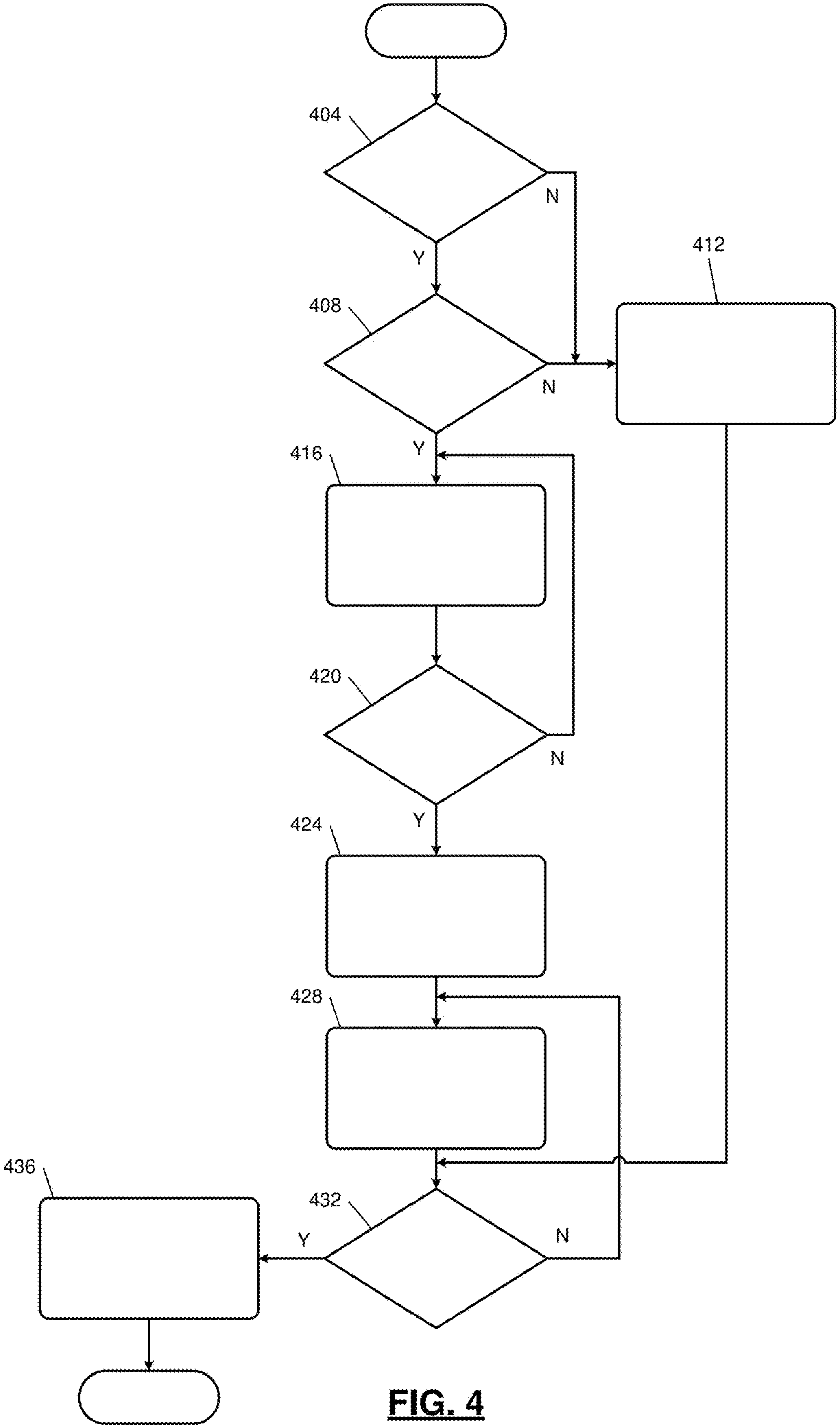
FIG. 4 is a flowchart depicting an example method of starting an engine.

FIG. 4 is a flowchart depicting an example method of starting the engine 102. Control begins with 404 while the vehicle is on and the engine 102 is not running (off). At 404, the cold start module 312 may determine whether the SOC 316 of the battery 206 is less than the predetermined SOC. The predetermined SOC may be calibratable and may be, for example, approximately 20% or another suitable value below which the engine 102 should be run to recharge the battery 206. If 404 is true, control may continue with 408. If 404 is false, no startup of the engine 102 may be performed, and control may return to 404. Alternatively, control may continue with 412 where startup of the engine 102 may be performed using the BAS 214 if necessary.

At 408, the cold start module 312 may determine whether the ambient temperature 320 is less than the predetermined temperature. The predetermined temperature may be calibrated and may be, for example, approximately 0 degrees Celsius or another suitable value. The predetermined temperature may be calibrated based on a torque to apply to the engine 102 by the BAS 214 to start up the engine 102 at the predetermined temperature, noise vibration and harshness of the startup of the engine 102 at the predetermined temperature, and/or one or more other parameters. If 408 is true, control may use the starter 202 followed by the BAS 214 to start the engine 102, and control may continue with 416. If 408 is false, the BAS control module 308 may apply power to the BAS 214 from the battery 206 such that the BAS 214 drives drive the crankshaft of the engine 102 at 412, and control may continue with 432.

At 416, the starter control module 304 engages the starter motor 202 with the engine 102 and applies power to the starter motor 202 from the battery 208 to begin cranking the engine 102 for startup. At 420, the BAS control module 308 determines whether the engine speed (RPM) is greater than or equal to a first predetermined speed. The first predetermined speed may be calibratable and may be, for example, approximately 150-200 revolutions per minute (RPM) or another suitable speed. If 420 is true, control may continue with 424. If 420 is false, control may return to 416 and continue using the starter motor 202 to increase the engine speed for the startup.

At 424, the BAS control module 308 controls the BAS 214 to match the engine speed. The BAS control module 308 may control the BAS 214 for example using closed loop control to increase the speed of the BAS 214 to the engine speed. At 428, once the speed of the BAS 214 reaches the engine speed, the BAS control module 308 controls the BAS 214 to continue increasing the engine speed. At 432, the ECM 114 may determine whether the engine speed is greater than or equal to a second predetermined speed. The second predetermined speed is greater than the first predetermined speed. The second predetermined speed may be calibratable and may be, for example, approximately 400-1,000 RPM or another suitable speed. If 432 is false, control returns to 428 to continue increasing the engine speed using the BAS 214 and not the starter motor 202. If 432 is true, the ECM 114 (e.g., a fuel control module) begins fueling the engine 102 and (e.g., a spark control module) provides spark to the engine 102 to initiate combustion with the cylinders and complete the startup at 436.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine startup system for a vehicle, comprising:
- a cold start module configured to selectively generate a cold start command when an ambient air temperature is less than a predetermined temperature;
- a starter control module configured to, in response to the generation of the cold start command, engage a starter motor with a crankshaft of an engine and apply power from a first battery to the starter motor; and
- a belt alternator starter (BAS) control module configured to:
  - not apply power from a second battery to a BAS after the generation of the cold start command until an engine speed of the engine is greater than a first predetermined speed; and
  - in response to a determination that the engine speed of the engine is greater than the first predetermined speed, apply power from the second battery to the BAS and further increase the engine speed of the engine,
- wherein the BAS control module is configured to, before applying power from the second battery to the BAS and further increase the speed of the engine, match a rotational speed of the BAS to the engine speed, and
- wherein the BAS control module is configured to match the rotational speed of the BAS to the engine speed using closed loop control.

2. The engine startup system of claim 1 further comprising an engine control module configured to begin fueling the engine and providing spark to the engine only once the engine speed is greater than a second predetermined speed.

3. The engine startup system of claim 2 wherein the second predetermined speed is greater than the first predetermined speed.

4. The engine startup system of claim 2 wherein the second predetermined speed is at least 400 revolutions per minute.

5. The engine startup system of claim 1 wherein the second battery is a different battery than the first battery.

6. The engine startup system of claim 1 wherein a first voltage rating of the second battery is greater than a second voltage rating of the first battery.

7. The engine startup system of claim 6 wherein the second voltage rating is approximately 12 volts direct current (DC).

8. The engine startup system of claim 1 wherein the BAS is configured to convert mechanical energy from the engine into electrical energy and charge the second battery with the electrical energy.

9. The engine startup system of claim 1 further comprising an electric propulsion motor configured to generate propulsion torque using power from the second battery.

10. The engine startup system of claim 1 wherein the ambient air temperature is less than 0 degrees Celsius.

11. The engine startup system of claim 1 wherein the BAS is coupled to a pulley of the engine via a belt.

12. The engine startup system of claim 1 wherein the cold start module is configured to generate the cold start command when both (a) the ambient air temperature is less than the predetermined temperature and (b) a state of charge of the second battery is less than a predetermined state of charge.

13. The engine startup system of claim 1 wherein the predetermined temperature is set based on a torque to begin turning a crankshaft of the engine at the predetermined temperature.

14. An engine startup system for a vehicle, comprising:
- a starter control module configured to, in response to generation of a cold start command, engage a starter motor with a crankshaft of an engine and apply power from a first battery to the starter motor;
- a cold start module configured to generate the cold start command when both (a) an ambient air temperature is less than a predetermined temperature and (b) a state of charge of a second battery is less than a predetermined state of charge;
- a belt alternator starter (BAS) control module configured to:
  - not apply power from the second battery to a BAS after the generation of the cold start command until an engine speed of the engine is greater than a first predetermined speed; and
  - in response to a determination that the engine speed of the engine is greater than the first predetermined speed, apply power from the second battery to the BAS and further increase the engine speed of the engine;
- an engine control module configured to begin fueling the engine and providing spark to the engine only once the engine speed is greater than a second predetermined speed,
- wherein the second predetermined speed is greater than the first predetermined speed,
- wherein the second battery is a different battery than the first battery, and
- wherein a first voltage rating of the second battery is greater than a second voltage rating of the first battery; and
- an electric propulsion motor configured to generate propulsion torque using power from the second battery.

15. An engine startup method for a vehicle, comprising:
- selectively generating a cold start command when an ambient air temperature is less than a predetermined temperature;
- in response to the generation of the cold start command, engaging a starter motor with a crankshaft of an engine and applying power from a first battery to the starter motor;
- not applying power from a second battery to a belt alternator starter (BAS) after the generation of the cold start command until an engine speed of the engine is greater than a first predetermined speed;
- in response to a determination that the engine speed of the engine is greater than the first predetermined speed, applying power from the second battery to the BAS and further increase the engine speed of the engine; and
- before applying power from the second battery to the BAS and further increasing the speed of the engine, matching a rotational speed of the BAS to the engine speed,
- wherein the matching includes matching the rotational speed of the BAS to the engine speed using closed loop control.

16. The engine startup method of claim 15 further comprising beginning fueling the engine and providing spark to the engine only once the engine speed is greater than a second predetermined speed.

17. The engine startup method of claim 16 wherein the second predetermined speed is greater than the first predetermined speed.

18. The engine startup method of claim 15 wherein the second battery is a different battery than the first battery.

19. The engine startup method of claim 15 further comprising, by an electric propulsion motor, generating propulsion torque using power from the second battery.

20. The engine startup method of claim 15 further comprising generating the cold start command when both (a) the ambient air temperature is less than the predetermined temperature and (b) a state of charge of the second battery is less than a predetermined state of charge.

* * * * *